United States Patent Office 3,022,663
Patented Feb. 27, 1962

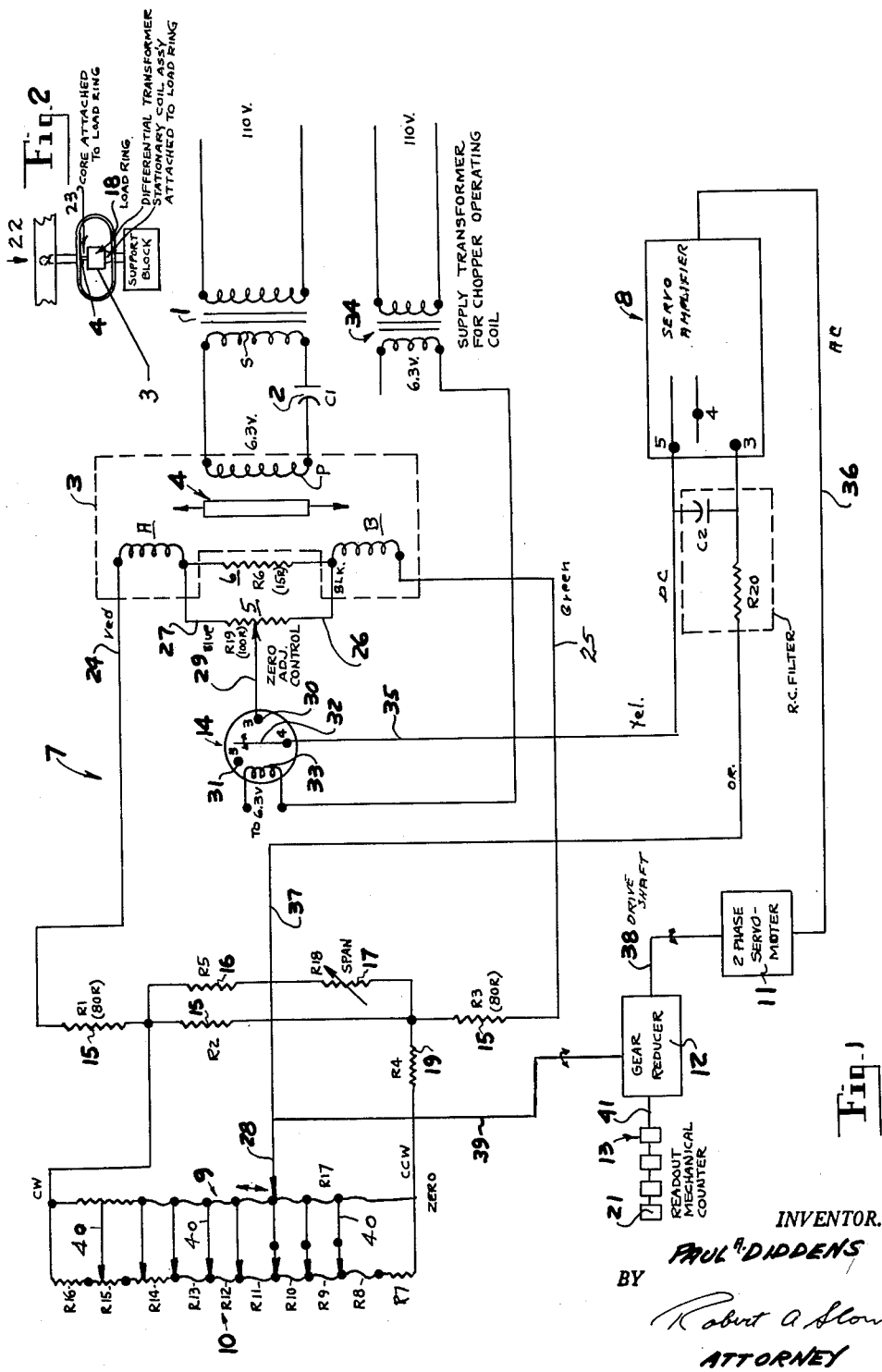

3,022,663
LOAD MEASURING SYSTEM
Paul A. Diddens, Detroit, Mich., assignor to Performance Measurements Co., Detroit, Mich., a corporation of Michigan
Filed Aug. 10, 1959, Ser. No. 832,661
6 Claims. (Cl. 73—141)

This invention relates to a measuring system and more particularly to a torque measuring system employing a linear variable differential transformer.

It is the object of the present invention to provide an accurate measurement of a remotely applied force, such as loads in tension or compression, torque, thrust, or motion.

It is the further object of this invention to utilize the resultant of a movement as a function of an applied force, and using this movement to control the electrical output in a circuit.

It is a further object to employ a linear variable differential transformer in conjunction with a Wheatstone bridge measuring circuit to which transformer has been applied a predetermined electrical potential, together with a variable resistor network in said circuit for obtaining a voltage balance therein, the application of a force and resultant movement of a control means effecting movements of a permeable core within said transformer effecting changes in the voltage applied to said circuit, together with automatic means controlled by the unbalance of voltage in said circuit produced by said core movement for automatically readjusting the resistor network rebalancing the circuit, and further incorporating measuring means of a readout character, indicating the extent of controlled movement of a slider with respect to a slidewire for said resistor network, for measuring in effect the longitudinal movement of said core, and concomitantly the quantity of the initial load which produces said movement.

It is another object herein to employ a load ring adapted to movably respond to external load, and mounted therein a linear variable differential transformer with the coils thereof anchored to the stationary side of the load ring and with the transformer core connected to the opposing movable side of said ring, and wherein the secondaries of said transformer are connected into an electrical measuring circuit, which includes a variable resistor network, and together with means responsive to changes in voltage between the secondaries of such transformer due to displacements of said core, for readjusting the resistor network for overcoming the voltage imbalance in said circuit produced by such core movement.

It is a further object herein to incorporate within said resistor network a series of linearizing potentiometers in series therewith, and in parallel connection thereto a slidewire variably and adjustably tapped into said potentiometers, and with a power operated slider movable over said slidewire for regulating the voltage of said resistor network.

It is another object to provide a zero adjusting control between the secondaries of said transformer together with a synchronous converter attached thereto for sampling differences of voltages created between said secondaries and said slidewire due to longitudinal displacement of the transformer core from external loads applied to said load ring.

It is another object to provide in said circuit a servoamplifier which will receive a D.C. error signal from the synchronous converter, change it into an A.C. signal, step up the amount of signal power sufficient to drive a two-phase servomotor, said motor, in turn depending upon the polarity of the D.C. input signal to said convertor movably driving the slider with respect to said slidewire causing said error signal to approach zero and for rebalancing the electrical voltage in the circuit.

It is another object to connect with said servomotor a readout mechanical counter having movable number wheels simultaneously driven by said servomotor with suitable gear reducer interposed for display in numerical form the resultant displacement of said core in terms of inches, force, pounds or whatever quantity is to be measured.

These and other objects will be seen from the following specification and claims in conjunction with the appended drawing in which:

FIG. 1 is a wiring diagram of the complete measuring system.

FIG. 2 is a diagrammatic view of the load ring and associated linear variable differential transformer, connected into the circuit of FIG. 1.

It will be understood that the above drawing illustrates merely a preferred circuit and embodiment of the present invention and that other embodiments are contemplated within the scope of the claims hereafter set forth.

The primary measurement of torque, for example, in conjunction with the present invention is accomplished by the use of load ring 18, FIG. 2, the deflection of which is a function of the force 22 applied thereto.

A linear variable differential transformer is diagrammatically indicated at 3 in FIG. 1, and is employed as a unitary component which may be purchased on the market. These are manufactured by Schaevitz Engineering of Camden, N.J. The present invention makes no claim to the structure of said transformer per se, but only in its use as a unit in the present measuring circuit.

Said transformer is primarily for the electrical measurement of mechanical quantities wherein heretofore other conventional means of measuring movement or force are not easily applicable. The present transformer is in effect an electro-mechanical transducer which produces an electrical output proportional to the longitudinal movement or displacement of a movable permeable core within said transformer.

This transformer employs primary P, FIG. 1 and the spaced secondaries A and B. The coupling between the primary and the secondaries is accomplished by a movable permeable iron core 4.

Said core is attached at 23, FIG. 2, to one end of load ring 18 adjacent the application of an external load 22. The stationary coil assembly A, B, P is connected and anchored to the other end of said load ring diametrically opposed to connection 23. Any deflection in the load ring causes a change in physical relationship between movable core 4 and said stationary coil assembly.

When said core is in a center position relative to said secondary coils A and B, equal voltages are developed in said secondary coils. This differential transformer, in the preferred embodiment, operates at a line voltage at 6.3 volts at 60-cycles per second. There is in the transformer a phase shift so that the output voltage lags the input voltage by some 70 or 80 degrees. The primary P of the differential transformer is fed from the 110 volt stepdown transformer 1. The capacitor 2 is connected in series between the primary of the differential transformer and the secondary S of said stepdown transformer. This capacitor provides the necessary phase shift so that the output voltage produced by the differential transformer is in phase with the contact closure of the synchronous convertor or chopper 14.

When the load ring 18, FIG. 2, is deflected, movable core 4 is caused to move causing unequal voltages to be developed in secondaries A and B. Assuming that when the load ring is not deflected, its movable core is midway between two coils A and B, and that the magnitude of the voltages developed in said coils A and B is 5-volts A.C. If the movable core 4 is now deflected upward by the load ring 18, FIG. 2, coil A will have more voltage induced into it than coil B.

Assuming that with the specified amount of core movement the voltage in coil A is now 6-volts and the voltage in coil B is 4-volts. Coils A and B are connected in series aiding i.e., the voltages add up so that the voltage measured between red lead 24 connected to coil A and green lead 25 connected to coil B should be 10-volts, either at core mid-position or at any point when the core is deflected from its midposition. As a result a current is caused to flow around measuring circuit loop 7.

The main loop consists of the following:

Coils A and B of linear transformer 3, items 5 and 6 which form a zero circuit hereafter described; resistances 15, 19, 10 and the slidewire assembly 9 in parallel to said circuit, and the additional resistance 15, R. 3.

The current flows in the measuring circuit loop as follows:

Assuming current flow beginning from coil A at the differential transformer; said current flows through red lead 24 into R–1, which is 80 ohms, for illustration, through R–1, into a resistor network consisting preferably of 8 linearizing potentiometers, for example. Said potentiometers 10 consist of resistors R–8 through R–15, inclusive. The network also includes end resistors R–7 and R–16.

Current also flows through slidewire 9 in parallel circuit across loop 7, and also through resistor R–2 which is in parallel with resistors R–5 and R–18. Resistors R–2, R–5 and R–18 comprise a span control hereafter described. The current also flows through resistor R–4 and leaves the resistor network flowing through R–3, 80 ohms for illustration, through the green wire 25 back to the bottom of coil B at the linear differential transformer. The current thence moves through coil B and into a black lead 26 and into the parallel resistance combination composed of R–6, 15 ohms for illustration, and R–19, 100 ohms for illustration.

R–6 and R–19, together provide a zero adjusting control in conjunction with slider 29, FIG. 1, the operation of which is further dscribed hereinafter. Said current leaves the zero control network 5—6 and returns via the blue lead 27 into coil A of transformer 3.

Assume that core 4 of the linear transformer is at center position and 5-volts developed in both coils A and B. If slider 28 on slidewire 9 is located at its extreme counterclockwise position, i.e., at a junction between R–4 and R–17, FIG. 1, the slider in effect will then see the same voltage as slider 29 on the zero control 5, if it is located at its center position.

If the movable core in the linear transformer is now displaced due to deflection of load ring 18, on application of load 22, FIG. 2, setting up voltages discussed before, i.e., 6-volts in coil A and 4-volts in coil B, it changes the relative potential of slider 29 of said zero control. There now exists a potential difference between slider 29 of zero control 5 and slider 28 of slidewire 9.

Synchronous convertor 14 or chopper, FIG. 1, includes contact 30 which is closed once every half line cycle. The time of closure is approximately 45 percent of one line cycle. Said convertor consists of a pair of spaced contacts 30—31 and a vibrating reed 32 which vibrates at 60-cycles per second. This reed movement is produced by an internal electro-magnetic coil 33 supplied from the 6.3 volts A.C. synchronous with the main line through the supply step down transformer 34. Said synchronous convertor 14 then provides sampling of this difference of voltage between slider 28 on slidewire 9 and slider 29 on the zero control 5. This sampling occurs every half cycle at a 60-cycle rate per second.

If the error signal is in a certain direction, the output of synchronous convertor 14 is a series of half wave pulses of one polarity. This then provides a pulsating D.C. error signal through yellow lead wire 35, the magnitude of which is a function of the unbalance of voltage in coils A and B.

This error signal is applied to an RC filter, consisting of resistance R–20 and capacitator C–2, FIG. 1, which smooths out the pulsations in line 35 to provide a steady D.C. voltage. This D.C. voltage is applied to servo-amplifier 8. This is a standard component which may be purchased on the market and which accepts a D.C. error signal, changes it to an A.C. signal, steps up the amount of signal power sufficient to drive the two-phase servomotor 11 connected thereto through lead 36. Amplifier 8 is joined to slider 28 by orange lead wire 37.

Driveshaft 38 of said servomotor is connected to gear reducer 12 whose take off shaft 39 rotates slider 28 over slidewire 9. Shaft 41 from said gear reducer drives mechanical counter 13 with direct reading elements 21. The direction which servomotor is driven is dependent upon the polarity of the input D.C. signal to the servo-amplifier.

When the unbalance occurs in the measuring circuit 7 as above described and the resultant D.C. signal is applied to servo-amplifier 8, the servomotor 11 is caused to drive slider 28 over slidewire 9.

In a conventional construction, the resistance network is of circular form as is also slidewire 9, so that in effect the slider 28 is rotatably driven by gear reducer 12, which is interposed between said slider and servomotor 11. This moves the slider in the proper direction over slidewire 9 to reduce the error voltage between slider 28 of slidewire 9 and slider 29 of zero control 5.

When this error signal is caused to approach zero by the motor driven movement of slider 28, the error signal applied to the input of servo-amplifier 8 decreases to near zero and servomotor 11 comes to a stop.

The circuit now is again at balance. At this point, the movable number wheels of read-out counter 13 display in numerical form the resultant displacement of core 4 of differential transformer 3 in terms of inches, force, pounds of whatever quantity is required to be measured.

With the coils A and B of linear transformer 3 now producing 6 and 4 volts, respectively, as described, and the core of the linear transformer is caused to move to its original center position, coils A and B again develop 5 volts each. This results from disengagement of load 22 from load ring 18 in FIG. 2.

A new unbalance exists between slider 29 of zero control 5 and slider 28 of slidewire 9. This reverses the phase of the A.C. voltage applied to synchronous convertor 14 and the resultant D.C. voltage applied to the input of servo-amplifier 8 is now of the opposite polarity as was the case in the first example. This causes servomotor 11 to rotate in the opposite direction to rebalance the bridge circuit 7 and bring the readout mechanical counter 13—21 back to zero.

FUNCTIONS OF SPECIFIC COMPONENTS

*Slidewire and Linearizing Potentiometer Assembly*

Slidewire 9 has impressed across it a voltage which is proportional to the full span of the instrument. In other words, the voltage impressed across slidewire assembly 9 and 10 is equal to the voltage differential produced by coils A and B as core 4 is moved from midposition to a position corresponding to the full force application on load ring 18. When the core of linear transformer 3 is at zero position, slider 28 of slidewire 9 is located at the extreme counterclockwise position. When the movable core is moved to a position, or to its final position corresponding to full force applied to the load ring, the slider 28 of slidewire 9 is caused to move to the full clockwise position.

As slider 28 traverses slidewire 9 from the extreme counterclockwise position to the full clockwise position, the readout mechanical counter 21 is caused to move from zero reading to the full numerical reading applied to load ring 18. These two items thus move in coincidence, the slidewire 9 and the readout mechanical counter 21. This relationship between these two components is a linear function; however, the resultant output of the linear differential transformer is not exactly a linear function of the core displacement in the transformer. Also, the load ring deflection is not exactly a linear function of the load applied to the load ring; in other words, these are slight non-linearities in both items.

In order for the readout mechanical counter 21 to read out in linear form, the force applied to the load ring, the slidewire must be made non-linear in exactly the opposite direction from the non-linearities which already exist in the system. This is accomplished by linearizing potentiometers R-8 through R-15 inclusive.

When calibrating the system, calibration is carried out as follows:

The numerical readout 21 on mechanical counter 13 is noted for the physical position of taps 40 on slidewire 9. These taps are connected into the resistive elements 10 at equally spaced distances. Assume that the readout mechanical counter 13 displays readings in 100 pound steps corresponding to various taps on slidewire 9. The tap corresponding to R-8, therefore, would be located at 100 pounds. The tap corresponding to the slider of R-9 would be located at 200 lbs.

When calibration is carried out a 100 lb. load would be applied to load ring 18; however, due to non-linearities in the system, the two-phase servomotor 11 would drive slider 28 of slidewire 9 to a position slightly different than that required for a readout of 100 on readout mechanical counter 13—21. The linearizing potentiometer R-8 is then adjusted to cause the voltage at tap 40 on the slidewire to be slightly different so as to cause the slider to move to a position on the slidewire so as to cause the readout mechanical counter to read exactly 100.

An increased load of 200 lbs. force is next applied to load ring 18, FIG. 2, and the readout 21 on the mechanical counter is again noted. If it is not 200 lbs., the slider or tap 40 on linearizing potentiometer R-9 is moved again to cause slidewire slider 28 to reposition itself so that the readout mechanical counter does indicate 200 lbs. This procedure is carried out for the full range of the instrument and when completed all the linearizing potentiometers R-8 through R-15 are locked in place and will remain as adjusted until some future time when calibration is again needed. The electrical circuit 7 is now compensated to take into consideration the non-linearities in both linear differential transformer 3 and load ring 18, thus resulting in a completely linear system.

Resistor R-2 is a shunting resistor for the slidewire and linearizing potentiometer combination to bring the voltage across this combination to approximately the voltage required for full range of the instrument.

Item 17, resistor R-18 is a span adjusting control and is used to make fine adjustments of the voltage across the slidewire.

Number 16, resistor R-5 is a limiting resistor to limit the authority of the span control over the circuit. In other words, it provides a lower limit of resistance which can be shunted across the combination of R-2 and items 9 and 10.

Item 19, resistor R-4 is made equal to the parallel combination of items 10 and 9. This is done so that when the linear variable transformer is at a center or neutral position and secondary coils A and B are delivering equal voltages, the error voltage in the circuit will be at zero when slider 28 is at its extreme counterclockwise or zero position.

Resistors R-1 and R-3 are equal in value, such as 80 ohms, and are used in combination with the resistance R-2, R-5 and R-18 of the slidewire linearizing potentiometers to produce a proper span voltage across the slidewire. The resistance of these is a function of the parallel resistance of the slidewire circuit.

Zero Control

The zero control 5, FIG. 1, is an adjustable potentiometer used to compensate for the slight mechanical displacement from zero which may exist in core 4 of linear variable transformer 3. The core would normally be set up mechanically for center position, but to provide fine adjustment, the electrical zero control is used so that mechanical adjustments need not be made. R-6 is a shunt resistor for the zero control and is used to adjust the voltage across the zero control potentiometer so that the proper degree of zero control is obtained.

Having described my invention, reference should now be had to the following claims.

I claim:

1. In combination, a measuring circuit loop, a linear variable differential transformer, including a pair of spaced secondaries series connected into said circuit loop, a primary, a phase shift control capacitor, a low voltage A.C. source, said primary being connected in series through said phase shift control capacitor to said low voltage A.C. source, and a movable permeable core, a resistor network connected in series in said circuit loop, a slidewire across said circuit loop in parallel circuit with said network and connected at spaced points with corresponding points in said network, a movable slider in contact with said slidewire to variably regulate the effective resistance of said network for balancing the voltage of said network with the voltage differential between said secondaries produced by longitudinal displacement of said core relative to said primary and secondaries, a two-phase servomotor operatively joined to said slider for selectively moving the same along and upon said slidewire, a synchronous convertor including a coil connected to and energized by said A.C. source connected between said secondaries for sampling differences of voltage between said secondaries and said slidewire due to longitudinal displacement of said core from a central position, a servo-amplifier connected with said slider and connected to and adapted to deliver A.C. signals of predetermined polarity to said servomotor, said convertor having a D.C. outlet joined to said servo-amplifier for delivering a pulsating D.C. signal of predetermined polarity, depending upon the relative potential between said secondaries and said slidewire, an RC filter interposed in the circuit between said servoamplifier and said D.C. outlet and slider respectively, to overcome phase shift in the differential transformer for producing a steady D.C. voltage to said amplifier, said servomotor driving said slider over said slidewire in a direction and amount relative to said resistor network as to reduce and substantially eliminate the error voltage between said slidewire and said secondaries, and a mechanical readout counter connected with said servomotor movable in unison with said slider for reading the amount of displacement of said core, the readings of said counter being a linear function of the amount of slider movement for rebalancing the voltage in said circuit loop.

2. The measuring circuit loop of claim 1, and a zero control potentiometer connected between said secondaries and joined to said synchronous convertor to compensate for slight mechanical displacement from zero of the core of said linear variable differential transformer.

3. The measuring circuit loop of claim 1, and a zero control potentiometer connected between said secondaries and joined to said synchronous convertor to compensate for slight mechanical displacement from zero of the core of said linear variable differential transformer, said zero control comprising an adjusting potentiometer including a slider and a precision shunt in parallel circuit therewith to adjust the zero setting of said potentiometer for proper zero setting range of said core.

4. The measuring circuit loop of claim 1, said resistor network consisting of a plurality of series connected linearizing potentiometers arranged in a circle, said slidewire being similarly arranged in parallel spaced relation, and a series of spaced taps respectively joined to said slidewire at their one ends and adjustably joined to their other ends to said potentiometers.

5. In combination, a measuring circuit loop, a linear variable differential transformer including a pair of spaced secondaries series connected into said circuit loop, a primary, a phase shift control capacitor, a low voltage A.C. source, said primary being connected in series through said phase shift control capacitor to said low voltage A.C. source, and a movable permeable core, a resistor network consisting of a plurality of series connected linearizing potentiometers connected in series in said circuit loop, a zero control adjustable potentiometer connected between said secondaries adapted to compensate for slight mechanical displacement from zero of said core, a slidewire across said circuit loop in parallel circuit with said network and connected at spaced points with the corresponding points in said network, a movable slider in contact with said slidewire to variably regulate the effective resistance of said network for balancing the voltage of said network with the voltage differential at said zero control produced by longitudinal displacement of said core relative to said primary and secondaries, a two-phase servomotor operatively joined to said slider for selectively moving the same along and upon said slidewire, a synchronous convertor including a coil connected to and energized by said A.C. source connected to said zero control potentiometer for sampling differences of voltage between said zero control potentiometer and said slidewire due to longitudinal displacement of said core from a central position, a servo-amplifier connected with said slider and connected to and adapted to deliver A.C. signals of predetermined polarity to said servomotor, said convertor having a D.C. outlet joined to said servo-amplifier for delivering a pulsating D.C. signal of predetermined polarity, depending upon the relative potential between said secondaries and said slidewire, an RC filter interposed in said circuit between said D.C. outlet and servo-amplifier, said servomotor driving said slider over said slidewire in a direction and amount relative to said resistor network as to reduce and substantially eliminate the error voltage between said slidewire and said secondaries, and a mechanical readout counter connected with said servomotor, movable in unison with said slider for directly reading the amount of displacement of said core, the readings of said counter being a linear function of the amount of slider movement for rebalancing the voltage in said circuit loop.

6. In a measuring circuit loop, a linear variable differential transformer, including a pair of spaced secondaries series connected into said circuit loop, a primary, a phase shift control capacitor, a low voltage A.C. source, said primary being connected in series through said phase shift control capacitor to said low voltage A.C. source, and a movable permeable core, a resistor network connected in series into said circuit loop, a slide wire across said circuit loop in parallel circuit with said network and connected at spaced points with corresponding spaced resistances in said network, a movable slider in contact with said slide wire to variably regulate the effective resistance of said network for balancing the voltage of said network with the voltage of said secondaries, the latter voltage depending upon longitudinal displacement of said core relative to said secondaries, a two-phase servomotor operatively joined to said slider for selectively moving the same along and upon said slide wire, a signal transmission system including a synchronous convertor connected with said secondaries for sampling differences of said voltage between said secondaries and said slide wire due to longitudinal displacement of said core from a central position, a servoamplifier connected with said slider and connected to and adapted to deliver A.C. signals of predetermined polarity to said servomotor, said converter having a D.C. outlet joined to said servoamplifier for delivering a pulsating D.C. signal of predetermined polarity, depending upon the relative potential between said secondaries and slide wire, an RC filter interposed between said D.C. outlet and amplifier, said servomotor driving said slider over said slide wire in a direction and amount relative to said resistor and network as to reduce and substantially eliminate the variables between said slide wire and said secondaries rebalancing the voltage in said circuit loop.

References Cited in the file of this patent

UNITED STATES PATENTS

| | | |
|---|---|---|
| 2,099,349 | Rosebury | Nov. 16, 1937 |
| 2,491,606 | Dickey et al. | Dec. 20, 1949 |
| 2,766,981 | Lauler et al. | Oct. 16, 1956 |
| 2,791,120 | Dietert et al. | May 7, 1957 |
| 2,794,971 | Hornfeck | June 4, 1957 |
| 2,885,611 | Macgeorge | May 5, 1959 |